United States Patent [19]

Hollander, Jr.

[11] 4,048,396
[45] Sept. 13, 1977

[54] BATTERY PACKAGE

[75] Inventor: Edward F. Hollander, Jr., Broomall, Pa.

[73] Assignee: John P. Glass, Essington, Pa.

[21] Appl. No.: 739,477

[22] Filed: Nov. 8, 1976

[51] Int. Cl.$^2$ ............................................. H01M 6/30
[52] U.S. Cl. .................................... 429/116; 429/163
[58] Field of Search ............... 429/110, 113, 116, 163, 429/185, 174, 4

[56] References Cited
U.S. PATENT DOCUMENTS 2,862,038 11/1958 Blarer .................................. 429/116
3,607,401 9/1971 Halpert et al. ........................ 429/116

Primary Examiner—Anthony Skapars
Attorney, Agent, or Firm—Smith, Harding, Earley & Follmer

[57] ABSTRACT

A battery package for storing an electric battery in unactivated condition and for quickly activating the battery, comprising a tube of flexible material having first and second ends, a first seal extending transversely across the tube and closing the first end, a second seal extending transversely across the tube and closing the second end, a medial seal extending transversely across the tube at a location between the first and second end seals and forming a first chamber and a second chamber, an electrolyte contained within the first chamber, and a pair of electrodes mounted in the second end seal and extending into the second chamber, said medial seal sealing the electrolyte from the electrodes for storing the battery in unactivated condition, said medial seal being weaker than said first and second seals, whereby the battery may be activated by squeezing the tube to rupture the medial seal and transfer the electrolyte from the first chamber into the second chamber to make contact with the electrodes.

7 Claims, 2 Drawing Figures

BATTERY PACKAGE

CROSS REFERENCE TO RELATED APPLICATIONS

This application is related to my following patent applications, all incorporated herein by reference: Ser. No. 720,084, filed Sept. 2, 1976 for PACKAGES, and file numbers E-436 for PACKAGING METHOD and E-437 for PACKAGE, both of which are being executed concurrently herewith.

BACKGROUND OF THE INVENTION

It has been a problem to provide an electrical battery that is easily stored in unactivated condition, that does not deteriorate during such storage, and that is easily activated when it is desired to use the battery as a source of electrical power.

SUMMARY OF THE INVENTION

These problems are solved in accordance with the invention by providing a package of flexible material having two chambers separated by a medial seal, with an electrolyte being stored in the first chamber and electrodes being stored in the second chamber. The battery is activated by squeezing the outside of the battery package to break the medial seal and transfer the electrolyte from the first chamber into the second chamber where it makes contact with the electrodes. The electrodes are provided with electrical contacts that are adapted to be contacted by electrical equipment.

DETAILED DESCRIPTION OF THE PREFERRED EMBODIMENTS

Figure 1:
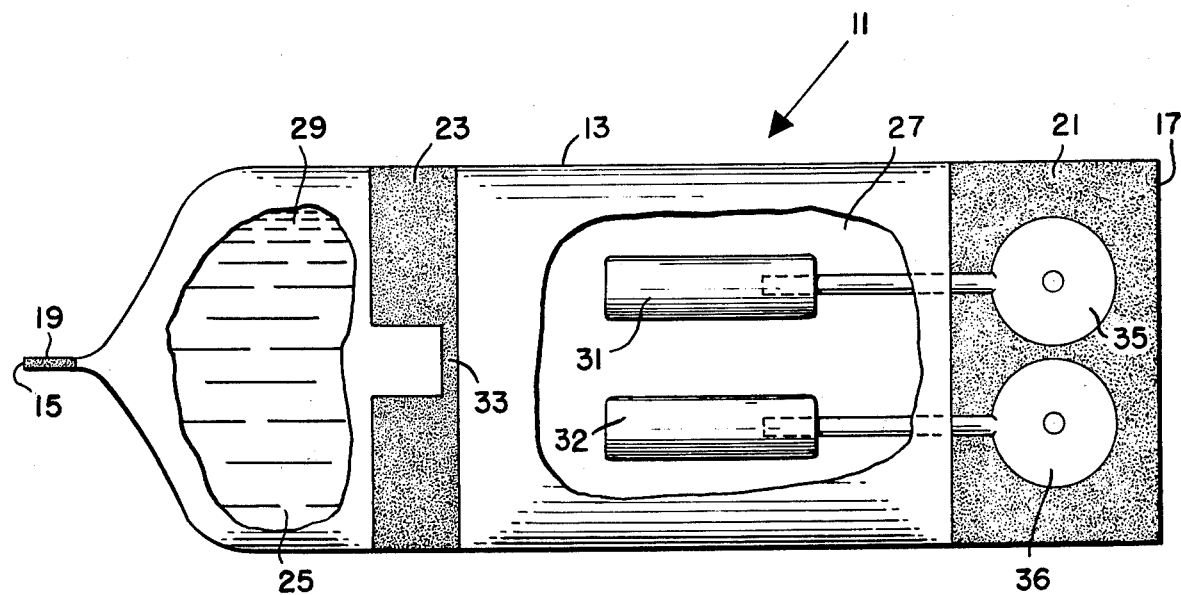
FIG. 1 is a view in section of a battery package constructed in accordance with the invention.

Turning now to the drawings, there is shown a battery package 11 for storing an electrical battery in unactivated condition and for quickly activating the battery when desired.

Battery package 11 includes a tube 13 of flexible material such as extruded polyethylene plastic having a first end 15 and a second end 17. A first ultrasonic seal 19 extends transversely across the tube 13 and closes first end 15, and a second ultrasonic seal 21 extends transversely across the tube 13 and closes the second end 17. Medial ultrasonic seal 23 extends transversely across the tube 13 at a location between first end seal 19 and second end seal 21, and forms a first chamber 25 and a second chamber 27.

An electrolyte 29 is contained within first chamber 25, and a pair of elecrodes 31, 32 are mounted in second end seal 21 and extend into second chamber 27.

The medial seal 23 seals the elctrolyte 29 from the electrodes 31, 32 while the battery package 11 is being stored in unactivated condition. Medial seal 23 is weaker than first seal 19 and second seal 21 so that the battery package 11 is activated by squeezing the tube 13 to rupture the medial seal 23 and transfer the electrolyte 29 from first chamber 25 into second chamber 27 to make contact with the electrodes 31, 32.

To insure this selecive bursting of medial seal 23, a neck area 33 is provided that is narrower in width than the remainder of medial seal 23. The medial seal 23 ruptures at its neck area 33 when the battery package 11 is squeezed. Accordingly, the battery package 11 may be activated by squeezing it with the fingers of one hand.

Electrodes 31, 32 are provided with electrical contacts 35, 36 mounted in a and covered by second seal 21. Electrical contacts 35, 36 are uncovered for use by peeling off a portion of the material of second seal 21 to expose the contacts for attachment to electrical equipment.

Figure 2:
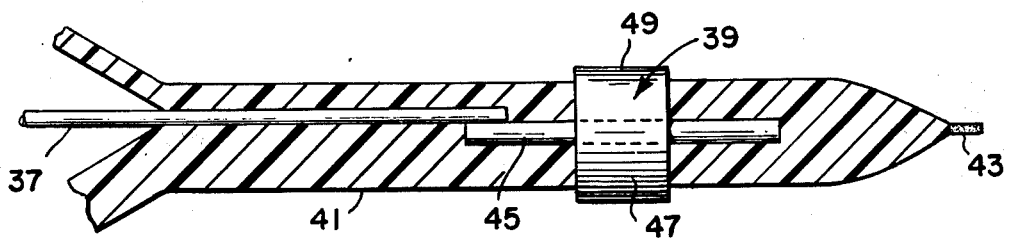
FIG. 2 is a partial view in section of an alternative embodiment of the battery'es electrodes and associated electrical contacts.

FIG. 2 illustrates another embodiment of the invention wherein outer ends 37 of electrodes extend outwardly from second seal 21. Electrical contacts 39 are positioned in contact with the electtrode outer ends 37, and may be soldered together. A straw 41 of flexible insulating material, which may be polyethylene plastic, encases each electrical contact 39 and its associated electrode outer end 37. A seal 43, which may be an ultrasonic weld, closes the outer end of each staw 41.

Each electrical contact 39 has a central core 45 and an enlarged contact area 47 extending outwardly from the axis of central core 45, with the outer surface 49 of contact area 47 being bare and outside the perimeter of the straw 41 for easy connection to electrical equipment.

Examples of the materials that may be used in the construction of battery package 11 are as follows.

EXAMPLE 1

Electrolyte 29 is sulphuric acid and water, electrode 31 is the positive plate and is made of lead peroxide, and electrode 32 is the negative plate and is made of sponge lead.

EXAMPLE 2

Electrolyte 29 is a solution of aqueous potassium hydroxide with lithium hydroxide, elecrode 31 is the positive plate and is made of nickel oxide, and electrode 32 is the negative plate and is made of iron.

EXAMPLE 3

Electrolyte 29 is a solution of aqueous potassium hydroxide with lithium hydroxide, electrode 31 is the positive plate and is made of nickel oxide, and electrode 32 is the negative plate and is made of cadmium alloyed with iron.

EXAMPLE 4

Electrolyte 29 is a solution of aqueous potassium hydroxide with lithium hydroxide, electrode 31 is nickel hydroxide and is the positive plate, and electrode 32 is cadmium alloyed with iron and is the negative plate.

EXAMPLE 5

Electrolyte 29 is an aqueous solution of potassium hydroxide saturated with zinc oxide, electrode 31 is positive and is made of silver peroxide, and electrode 32 is negative and is made of porous zinc.

An advantage of tube 13 being made of a synthetic plastic is that such material is insensitive to the effects of gassing of the electrolyte 29. Another advantage of this material is its insensitivity to temperature extremes of hot and cold.

The different rupture pressures of the seals 19, 21, and 23, especially the necked-down portion 33 of medial seal 23, is a design feature of the seals.

I claim:

1. A battery package for storing an electric battery in unactivated condition and for quickly activating the battery, comprising
    a tube of flexible material having first and second ends,
    a first seal extending transversely across the tube and closing the first end,
    a second seal extending transversely across the tube and closing the second end,
    a medial seal extending transversely across the tube at a location between the first and second end seals and forming a first chamber and a second chamber,
    an electrolyte contained within the first chamber,
    and a pair of electrodes mounted in the second end seal and extending into the second chamber,
    said medial seal sealing the electrolyte from the electrodes for storing the battery in unactivated condition,
    said medial seal being weaker than said first and second seals,
    whereby the battery may be activated by squeezing the tube to rupture the medial seal and transfer the electrolyte from the first chamber into the second chamber to make contact with the electrodes.

2. The battery package of claim 1,
    wherein said medial seal is provided with a neck area that is narrower in width than the remainder of the medial seal, whereby the medial seal ruptures at its neck area when the package is squeezed.

3. The battery package of claim 1,
    wherein said electrodes are provided with electrical contacts mounted in and covered by said second seal,
    said electrical contacts being uncovered for use by peeling off a portion of the second seal.

4. The battery package of claim 1,
    wherein said seals are ultrasonic welds.

5. The battery package of claim 1,
    wherein said medial seal is provided with a neck area that is narrower in width than the remainder of the medial seal, whereby the medial seal ruptures at its neck area when the package is squeezed, and
    wherein said seals are ultrasonic welds.

6. The battery package of claim 1,
    wherein the outer ends of the electrodes extend outwardly through the second seal, and including
    electrical contact in contact with the outer ends of the electodes,
    a straw of flexible material encasing each electrical contact and the outer end of its associated electrode,
    and a seal closing the outer end of each straw.

7. The battery package of claim 6,
    each electrical contact having a central core and an enlarged contact area extending outwardly from the axis of the central core,
    with the outer surface of the contact area being bare and outside the straw.

* * * * *